(No Model.)
C. E. EGAN & F. M. BAILEY.
TEMPERATURE INDICATOR.
No. 504,335.  Patented Sept. 5, 1893.
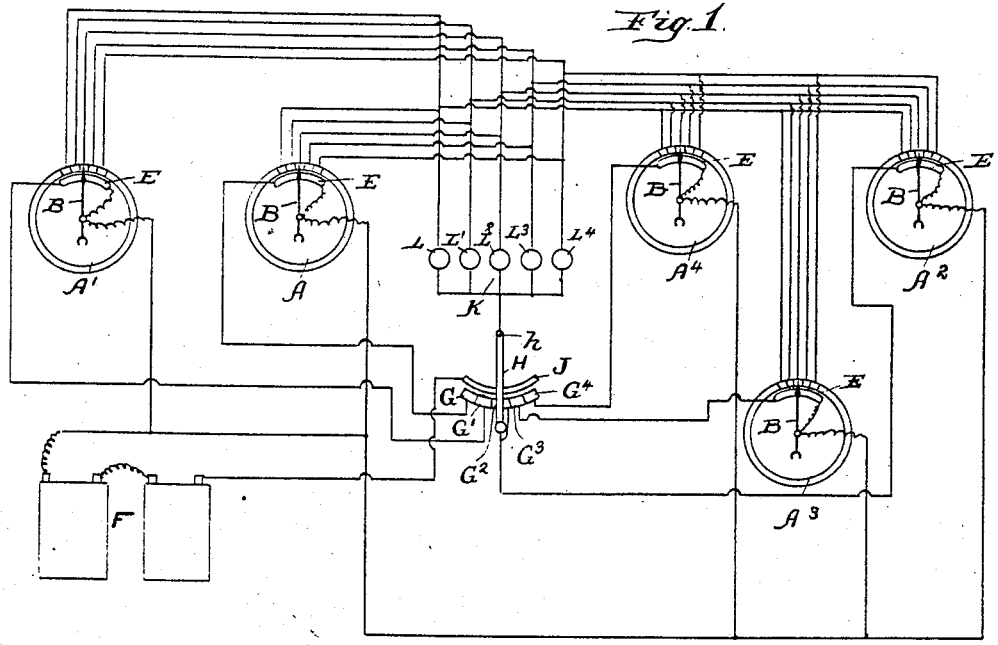
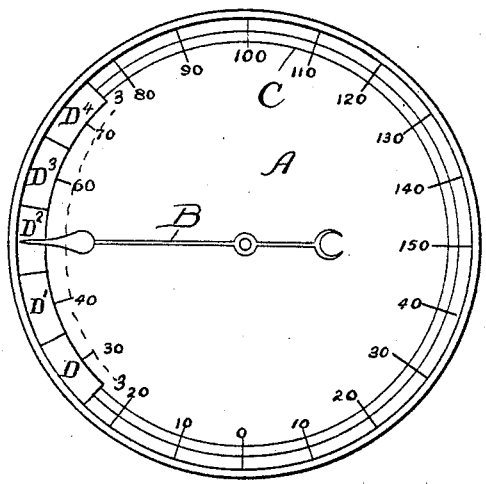
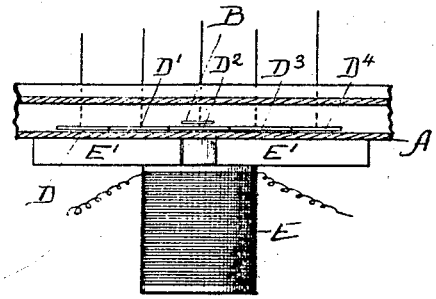
Witnesses:
Inventors
Charles E. Egan
Fred M. Bailey
By Munday, Evarts & Adcock
their Attorneys.

UNITED STATES PATENT OFFICE.

CHARLES E. EGAN AND FRED M. BAILEY, OF CHICAGO, ILLINOIS; SAID EGAN ASSIGNOR TO SAID BAILEY.

TEMPERATURE-INDICATOR.

SPECIFICATION forming part of Letters Patent No. 504,335, dated September 5, 1893.

Application filed March 13, 1893. Serial No. 465,846. (No model.)

*To all whom it may concern:*

Be it known that we, CHARLES E. EGAN and FRED M. BAILEY, citizens of the United States, residing at Chicago, in the county of Cook and State of Illinois, have invented a new and useful Improvement in Temperature-Indicators, of which the following is a specification.

This invention relates to an apparatus designed for use more especially in school buildings, where there is a plurality of rooms heated by a heating apparatus located, for example, in the basement. The purpose is to afford a means whereby the janitor or person controlling the heating apparatus will be able to ascertain the temperature of any one or all of the several rooms from his station in the basement, in order that he may govern said temperature.

The nature of the invention will be understood from the subjoined description and claims and the accompanying drawings which form a part of this specification, and in which—

Figure 1 is a diagrammatic view of the apparatus and the electric circuit thereof, showing the same as applied to indicate the temperature of five rooms. Fig. 2 is a face view of the dial thermometer employed, and Fig. 3 is a sectional view of the same on line 3—3, Fig. 2.

In said drawings A represents an ordinary dial thermometer, such as are in common use, and wherein the changes in temperature are indicated by the revolution of the hand or pointer B around a circular scale C, divided into spaces denoting the degrees and numbered, as is usual in such cases. We provide this thermometer with a series of metallic contact pieces D, D', $D^2$, $D^3$, $D^4$, &c., insulated and placed to correspond to the divisions of the dial, and in position such that the end of the pointer B in its movement caused by change of temperature, will pass over said contact strips close thereto but without touching the same or dragging on them, so that said contact strips afford no obstacle to the free movement of said indicating pointer. Beneath said contact strips we place an electro-magnet E with its core or pole piece extensions thereof E' underlying all of the contact pieces D, D', &c. It will now be understood that if separate wires be attached to each of the contact strips D, D', &c., and the wire connected to the iron pointer B, said pointer being either flexible or loosely pivoted, that whenever an electric current is sent through the helix of the electro-magnet E, the outer end of the iron pointer B will be attracted toward the magnet and brought down into contact with whichever one of the metallic contact pieces D D', &c., that it may chance to stand over at the moment. And, it will also be understood by this means, the electric circuit connected with the particular contact closed and an indication of the position of the pointer B thereby conveyed to a distant pointer on said closed circuit. And it will be further readily understood that such an arrangement will not in any wise interfere with the delicate balance requisite to the accurate operation of the thermometer, and that as soon as the electro-magnet E is cut out of circuit the pointer B will be perfectly free to move in its circular path without friction or dragging as it may be impelled by subsequent changes of temperature. Of course many ways of utilizing this apparatus of the dial thermometer, electro-magnet and contact strips may be devised or suggested, and we do not wish to limit ourselves in this respect. An excellent arrangement, and the best we know at present, is the one shown in the drawings, as follows: F is a battery, or other source of electric energy. From one pole of this battery proceeds a circuit wire connected to the pointer B of the dial. In Fig. 1 five dials are shown, and this pole of the battery is connected to the pointer of all of these dials, the supposition being that the dials are located in separate rooms or separate parts of the building. From the pointer or its pivot the circuit is continued to the electro-magnet E belonging to the dial. And from the electro-magnet of each dial the circuit is continued to an insulator contact piece G or G' or $G^2$, &c., there being one of these contact pieces for each of the dials, and they are arranged to form part of a switch, of which H is the lever. This lever H rests on a contact bar J, which is connected by a circuit wire to the other pole of the battery. Now, when the switch lever H is in contact with the strip J and any particular one of the several insulated contact pieces G, G', &c., let us say for example the contact piece G, the circuit will be through that particular contact piece G, and through the electro-magnet of the particular dial connected with the piece G. And the pointer of that dial will be attracted down and made to form electric contact with the insulated pieces D D', &c., over which at the moment it happens to stand. From each one of the contact pieces D, D', &c., a wire is carried to the annunciator device K. This annunciator device may consist of an apparatus similar to such as are employed in hotels, wherein a small magnet is caused to release a curtain or hinged flap whenever a circuit is sent through the small magnet, and thus disclose a number or figure. One of these magnets and its curtain is employed for each of the contact pieces D, D', $D^2$, &c., as indicated at L, L', $L^2$, $L^3$, $L^4$. The contact piece D of all of the dials is connected to the indicator L. The contact piece D' of all to the indicator L', and so on in like manner throughout the series. From the small magnets of all the indicators L, L', &c., a common wire passes to the switch lever H and consequently by way of the contact strip J, reaches the battery.

The operation will be as follows: Let us suppose that the switch lever H stands entirely out of contact with the strip J and the contact pieces G, G', &c., in which case the battery circuit will be entirely broken, and which position it will normally occupy in order to save unnecessary expenditure of battery. And further let it be supposed that the janitor or person in the furnace room of the building, wishes to ascertain the existing temperature in any one of the rooms where the dial thermometers are located. Say for example he desires to test the condition of the thermometer marked $A^3$ on the diagram, Fig. 1, in such case he will swing the switch lever on its pivot h, until said lever stands over the contact piece $G^3$. He will then press said switch lever down until it makes contact with the strip J and said contact piece $G^3$, and the circuit will then be from one pole of the battery to the pointer of said dial $A^3$, and said magnet will attract the pointer of this dial and cause it to come down into contact with which every one of the contact pieces D, D', &c., it chances to overlie, and a portion of the same current will thereupon be immediately shunted through said pointer, its underlying contact strip and the particular wire connected therewith and to the particular indicator L, L', &c., and so to the switch lever H, strip J and back to the battery. The result will be of course that the particular indicator L, L', &c., which corresponds to the contact piece underlying the pointer of said thermometer $A^3$ will be operated and caused to indicate the position of said pointer, and consequently the existing temperature of the room in which said thermometer stands. By moving the switch and depressing in upon any one of the several contact pieces G, G', &c., the operator may thus ascertain in turn the position of the pointer of any one of the several thermometers and consequently the temperature of any one of the several rooms where the same are located, and may govern the heat accordingly by proper attention to the furnace or heating apparatus.

In the drawings, to avoid confusion, we have shown the contact pieces on the scale of the thermometer, unnecessarily large. And for the same reason we have shown only five of such contact pieces. Of course it will be understood that these contact pieces may be very narrow to indicate a closer division and may be much more numerous, extending as far along the scale as it is desired, the circuit wires and indicators being correspondingly multiplied.

We claim—

1. The combination with a dial thermometer, of insulated contact pieces arranged along the scale of said thermometer, an electro-magnet placed beneath said scale, and the pointer constructed to swing clear of the scale of the contact pieces, and to act as the armature of said electro-magnet and also as means of electrical contact with said scale of contact pieces, substantially as specified.

2. The combination with a dial thermometer provided with a scale of insulated contact pieces, a pointer freely revolving over said scale and capable of acting as an armature and an electrical contact, an electro-magnet beneath the scale in combination with an electrical circuit, a switch or means for opening and closing said circuit, and an electrical means for indicating the particular one of the contact pieces of the scale which the pointer is in contact with, substantially as specified.

3. The combination of a series of dial thermometers located in different places, each provided with a scale of insulated contact pieces, a pointer capable of acting as an armature and also as an electrical contact, an electro-magnet placed to attract said pointer into contact with said scale, combined with an electrical current and circuits which includes a switch for making and breaking the circuit and changing it from one to the other of said thermometers, and means for indicating electrically which of the series of contact pieces of the scale or scales the pointer is in contact with, substantially as specified.

CHARLES E. EGAN.
FRED M. BAILEY.

Witnesses:
H. M. MUNDAY,
EMMA HACK.